US009334881B2

(12) United States Patent
Tsuruta et al.

(10) Patent No.: US 9,334,881 B2
(45) Date of Patent: May 10, 2016

(54) INDUSTRIAL VEHICLE

(75) Inventors: Megumu Tsuruta, Tokyo (JP); Keiji Ito, Tokyo (JP); Takuya Nakada, Tokyo (JP)

(73) Assignee: MITSUBISHI NICHIYU FORKLIFT CO., LTD., Kyoto (JP)

( * ) Notice: Subject to any disclaimer, the term of this patent is extended or adjusted under 35 U.S.C. 154(b) by 544 days.

(21) Appl. No.: 13/822,979

(22) PCT Filed: Sep. 14, 2011

(86) PCT No.: PCT/JP2011/070949
§ 371 (c)(1),
(2), (4) Date: Mar. 13, 2013

(87) PCT Pub. No.: WO2012/036187
PCT Pub. Date: Mar. 22, 2012

(65) Prior Publication Data
US 2013/0167521 A1 Jul. 4, 2013

(30) Foreign Application Priority Data
Sep. 14, 2010 (JP) ................................ 2010-205629

(51) Int. Cl.
*F16D 31/02* (2006.01)
*F15B 13/00* (2006.01)
*B66F 9/22* (2006.01)

(52) U.S. Cl.
CPC . *F15B 13/00* (2013.01); *B66F 9/22* (2013.01); *F15B 2211/50518* (2013.01); *F15B 2211/50536* (2013.01)

(58) Field of Classification Search
CPC ............ F15B 2211/50518; F15B 2211/50536; F15B 20/007
See application file for complete search history.

(56) References Cited

U.S. PATENT DOCUMENTS 4,819,429 A * 4/1989 Kordak .................. F15B 7/005 60/414

FOREIGN PATENT DOCUMENTS

CN 1846068 A 10/2006
CN 101688597 A 3/2010

(Continued)

OTHER PUBLICATIONS

European Search Report mailed Aug. 20, 2014 for related Application No. 11825187.5.

(Continued)

*Primary Examiner* — Nathaniel Wiehe
*Assistant Examiner* — Daniel Collins
(74) *Attorney, Agent, or Firm* — Birch, Stewart, Kolasch & Birch, LLP

(57) ABSTRACT

A forklift (1) according to the present invention includes: an engine (7); a hydraulically-operated device for cargo handling (2); a pump for cargo handling (5) that is driven by the engine (7); hydraulic piping for cargo handling (8) that connects the pump for cargo handling (5) and the hydraulically-operated device for cargo handling (2); discharge piping (110) that branches from the hydraulic piping for cargo handling (8) and is connected to a tank (4); a switching valve (111) capable of switching the opening and closing of the discharge piping (110); a control device (13) that closes the discharge piping (110) when the rotation speed of the engine (7) is larger than a predetermined value, and opens the discharge piping (110) when the rotation speed of the engine (7) is less than or equal to a predetermined value; and a sub-relief valve (112) that adjusts the flow rate of hydraulic oil that is discharged from the discharge piping (110) to the tank (4), on the bases of the pressure or the flow rate of the hydraulic oil.

1 Claim, 3 Drawing Sheets

(56) References Cited

FOREIGN PATENT DOCUMENTS

| | | | |
|---|---|---|---|
| JP | 57-11291 | U | 1/1982 |
| JP | 61-126230 | A | 6/1986 |
| JP | 63-248987 | A | 10/1988 |
| JP | 2-96442 | U | 8/1990 |
| JP | 2531320 | B2 | 9/1996 |
| JP | 3070387 | B2 | 7/2000 |
| JP | 2004-150115 | A | 5/2004 |
| JP | 2010-76937 | A | 4/2010 |
| WO | WO 2008/078941 | A1 | 7/2008 |

OTHER PUBLICATIONS

Chinese Office Action mailed Jun. 30, 2014 for related Chinese Application No. 201180042432.3 with an English translation of the search report only.

Japanese Office Action mailed Jun. 3, 2014 for related JP Application No. 2010-205629 with an English translation.

International Search Report mailed Dec. 13, 2011 for counterpart PCT Application No. PCT/JP2011/070949 with English Translation.

* cited by examiner

INDUSTRIAL VEHICLE

TECHNICAL FIELD

The present invention relates to an industrial vehicle in which hydraulic oil is supplied from a hydraulic pump that is driven by an engine to a hydraulically-operated device for a cargo handling operation or for steering assistance.

Priority is claimed on Japanese Patent Application No. 2010-205629 filed on Sep. 14, 2010, the content of which is incorporated herein by reference.

BACKGROUND ART

At the time of cargo handling work such as lifting and moving heavy goods, an industrial vehicle such as a forklift is used. As the industrial vehicle, an industrial vehicle in which an arm for a cargo handling operation or power steering for steering assistance is operated by oil pressure is widely used. This industrial vehicle is provided with a hydraulic pump that is driven by an engine, and configured such that hydraulic oil discharged from the hydraulic pump is supplied to a hydraulically-operated device that is operated by oil pressure.

However, in recent years in which improvement in fuel consumption or regulation of emission gas has been carried out from viewpoints of global environment protection or the like, an engine of minimum performance according to an output that is required has been used. In a case of using such an engine, if the load of a hydraulic pump increases, the torque of the engine is insufficient. Thus, a hydraulic pump cannot be driven, and a phenomenon in which rotation of the engine stops (a so-called engine stall) occurs. Then, since such an engine stall leads to a sudden stopping of operation of an industrial vehicle, reliable preventive measures are desired.

Therefore, an industrial vehicle provided with a hydraulic system which can prevent occurrence of such an engine stall is proposed in the related art (refer to, for example, PTL 1). FIG. 5 is a schematic diagram showing a hydraulic system of an industrial vehicle 70 related to an example of the related art. The industrial vehicle 70 includes a pump for cargo handling 72*a*, a pump for steering 72*b*, a control valve 73, hydraulic piping 74*a* and 74*b*, discharge piping 75, an unloading valve 76, a rotation speed sensor 77, a pressure sensor 78, and a control device 79.

The pump for cargo handling 72*a* and the pump for steering 72*b* are driven by an engine 71 so as to discharge hydraulic oil. The control valve 73 controls supply of the hydraulic oil to a hydraulically-operated device for a cargo handling operation (not shown) and a hydraulically-operated device for steering (not shown). The hydraulic piping 74*a* and the hydraulic piping 74*b* connect the pump for cargo handling 72*a* and the pump for steering 72*b* to the control valve 73. The discharge piping 75 branches from the hydraulic piping 74*a* and is connected to a tank. The unloading valve 76 selectively opens or closes the discharge piping 75. The rotation speed sensor 77 detects the rotation speed of the engine 71. The pressure sensor 78 detects the pressure of the hydraulic oil flowing through the hydraulic piping 74*a*. The control device 79 controls an operation of the unloading valve 76 on the basis of input signals from the rotation speed sensor 77 and the pressure sensor 78.

According to such a hydraulic system, at the time of usual cargo handling work, a state is created where the discharge piping 75 is closed by the unloading valve 76, and thus all of the hydraulic oil discharged from the pump for cargo handling 72*a* is sent to the control valve 73 through the hydraulic piping 74*a*.

Further, all of the hydraulic oil discharged from the pump for steering 72*b* is sent to the control valve 73 through the hydraulic piping 74*b* and is shunted into the inside of the control valve 73, thereby being preferentially supplied to the hydraulically-operated device for steering. Then, surplus hydraulic oil which has not been supplied to the hydraulically-operated device for steering is supplied to the hydraulically-operated device for a cargo handling operation.

On the other hand, if the rotation speed of the engine 71 becomes less than or equal to a predetermined value, or if the pressure of the hydraulic oil becomes greater than or equal to a predetermined value, the control device 79 determines that there is a possibility that an engine stall may occur, and controls an operation of the unloading valve 76, thereby opening the discharge piping 75. Then, all of the hydraulic oil discharged from the pump for cargo handling 72*a* is discharged from the hydraulic piping 74*a* through the discharge piping 75 to the tank. In this way, since the load of the pump for cargo handling 72*a* is reduced, occurrence of an engine stall due to a shortage of the torque of the engine 71 can be prevented before it happens.

CITATION LIST

Patent Literature

[PTL 1] Japanese Unexamined Patent Application, First Publication No. 2004-150115

SUMMARY OF INVENTION

Technical Problem

However, according to the industrial vehicle 70 of the related art, while occurrence of an engine stall is prevented, there is a problem in that the operability of the hydraulically-operated device for a cargo handling operation is reduced. That is, if the rotation speed of the engine 71 or the pressure of the hydraulic oil meets a predetermined condition, whereby the unloading valve 76 opens the discharge piping 75, all of the hydraulic oil discharged from the pump for cargo handling 72*a* is discharged by the tank. In this way, since only the surplus hydraulic oil from the pump for steering 72*b* is supplied to the hydraulically-operated device for a cargo handling operation, and thus a state where supply of the hydraulic oil is insufficient is created, operation speed of cargo handling is reduced.

Further, according to the industrial vehicle 70 of the related art, there is also a problem in that a complicated hardware configuration and a complicated control system are required by providing both the rotation speed sensor 77 and the pressure sensor 78.

The present invention has been made in consideration of such circumstances and has an object of providing an industrial vehicle in which it is possible to prevent occurrence of an engine stall at the time of the lowering of the output of an engine, without reducing the operability of a hydraulically-operated device, by simple hardware configuration and control system.

Solution to Problem

According to an aspect of the invention, there is provided an industrial vehicle including: an engine that is a driving source; a hydraulically-operated device that is operated by oil pressure; a hydraulic pump that is driven by the engine and supplies hydraulic oil to the hydraulically-operated device; hydraulic piping that connects the hydraulic pump and the hydraulically-operated device; discharge piping that branches from the hydraulic piping and is connected to a tank; a switching valve that is provided in the discharge piping and can switch opening or closing of the discharge piping; a control device that closes the discharge piping by controlling the switching valve in a case where a rotation speed of the engine is larger than a predetermined value, and opens the discharge piping by controlling the switching valve in a case where the rotation speed of the engine is less than or equal to a predetermined value; and a valve that adjusts the flow rate of the hydraulic oil which is discharged from the discharge piping to the tank, on the basis of the pressure or the flow rate of the hydraulic oil which flows from the hydraulic pump into the hydraulic piping.

According to such a configuration, when the rotation speed of the engine is larger than a predetermined value, the switching valve subjected to control of the control device closes the discharge piping. In this way, the hydraulic oil discharged from the hydraulic pump is not discharged to the tank and all the hydraulic oil is supplied to the hydraulically-operated device.

On the other hand, if the rotation speed of the engine becomes less than or equal to a predetermined value, the switching valve subjected to control of the control device opens the discharge piping. In this way, the hydraulic oil discharged from the hydraulic pump becomes capable of flowing from the hydraulic piping into the discharge piping and only an appropriate amount adjusted by the valve on the basis of the pressure or the flow rate of the hydraulic oil is discharged to the tank, whereby the minimum oil pressure required for the hydraulically-operated device can be supplied.

Further, in the industrial vehicle according to the above aspect of the invention, the valve may be provided in the discharge piping and discharge the hydraulic oil from the discharge piping to the tank when the pressure of the hydraulic oil flowing through the discharge piping reaches a predetermined value.

According to such a configuration, when the rotation speed of the engine is larger than a predetermined value, and thus the switching valve closes the discharge piping, all of the hydraulic oil discharged from the hydraulic pump flows to a side of the hydraulically-operated device. In this way, when the output of the engine is high, all the pressure of the hydraulic oil discharged from the hydraulic pump is used to operate the hydraulically-operated device.

On the other hand, if the rotation speed of the engine becomes less than or equal to a predetermined value, and thus the switching valve opens the discharge piping, the valve provided in the discharge piping discharges some of the hydraulic oil flowing through the discharge piping, to the tank, whereby the pressure of the hydraulic oil is adjusted so as not to become higher than a predetermined value. In this way, when the output of the engine is lowered, by reducing the load of the hydraulic pump by reducing the pressure of the hydraulic oil, occurrence of an engine stall due to a shortage of the torque of the engine can be prevented before it happens. In addition, since, although the pressure of the hydraulic oil is reduced, preset pressure is secured, and thus the minimum oil pressure necessary to operate the hydraulically-operated device is supplied, a reduction in the operability of the hydraulically-operated device can be minimized.

Further, the industrial vehicle according to the above aspect of the invention may further include bypass piping that connects a position further to the upstream side than the switching valve in the discharge piping and a position further to the downstream side than a branching position of the discharge piping in the hydraulic piping, wherein the valve may be provided at the branching position and distribute the hydraulic oil flowing from the hydraulic pump into the hydraulic piping, thereby making a preset flow rate of hydraulic oil flow to a side of the hydraulically-operated device and the remaining hydraulic oil flow to the discharge piping.

According to such a configuration, when the rotation speed of the engine is larger than a predetermined value, and thus the switching valve closes the discharge piping, the hydraulic oil discharged from the hydraulic pump is distributed by the valve, and thus a preset flow rate of hydraulic oil flows to a side of the hydraulically-operated device and the remaining hydraulic oil flows to a side of the discharge piping. However, since the discharge piping is in a closed state, the hydraulic oil that flowed to a side of the discharge piping flows to a side of the hydraulically-operated device through the bypass piping. As a result, all of the hydraulic oil discharged from the hydraulic pump flows to a side of the hydraulically-operated device. In this way, when the output of the engine is high, all the pressure of the hydraulic oil discharged from the hydraulic pump is used to operate the hydraulically-operated device.

On the other hand, if the rotation speed of the engine becomes less than or equal to a predetermined value, and thus the switching valve opens the discharge piping, all of the hydraulic oil distributed by the valve, thereby flowing to a side of the discharge piping, is discharged to the tank through the discharge piping. As a result, only a preset flow rate of hydraulic oil distributed by the valve flows to a side of the hydraulically-operated device. In this way, when the output of the engine is lowered, by reducing the load of the hydraulic pump by reducing the flow rate of the hydraulic oil, occurrence of an engine stall due to a shortage of torque of the engine can be prevented before it happens. In addition, since, although the flow rate of the hydraulic oil is reduced, a preset flow rate is secured, and thus a minimum flow rate necessary to operate the hydraulically-operated device is supplied, a reduction in the operability of the hydraulically-operated device can be minimized.

Further, in the industrial vehicle according to the above aspect of the invention, the valve may be provided in the discharge piping and discharge the hydraulic oil from the discharge piping to the tank when the flow rate of the hydraulic oil flowing through the discharge piping reaches a predetermined value.

According to such a configuration, when the rotation speed of the engine is larger than a predetermined value, and thus the switching valve closes the discharge piping, all of the hydraulic oil discharged from the hydraulic pump flows to a side of the hydraulically-operated device. In this way, when the output of the engine is high, all the pressure of the hydraulic oil discharged from the hydraulic pump is used to operate the hydraulically-operated device.

On the other hand, if the rotation speed of the engine becomes less than or equal to a predetermined value, and thus the switching valve opens the discharge piping, the valve provided in the discharge piping discharges some of the hydraulic oil flowing through the discharge piping, to the tank, whereby the flow rate of the hydraulic oil is adjusted so as not to become greater than a predetermined value. In this way, when the output of the engine is lowered, by reducing the load of the hydraulic pump by reducing the flow rate of the hydraulic oil, occurrence of an engine stall due to a shortage of the torque of the engine can be prevented before it happens. In addition, although the flow rate of the hydraulic oil is reduced, a preset flow rate is secured, and thus a minimum flow rate necessary to operate the hydraulically-operated device is supplied, a reduction in the operability of the hydraulically-operated device can be minimized.

Advantageous Effects of Invention

According to the industrial vehicle related to the above aspect of the invention, if the rotation speed of the engine becomes less than or equal to a predetermined value, and thus the output of the engine is lowered, an appropriate amount of hydraulic oil adjusted by the valve is discharged to the tank. In this way, the load of the hydraulic pump is reduced, whereby occurrence of an engine stall due to a shortage of the torque of the engine can be prevented before it happens.

Further, since it is sufficient if an operation of the switching valve is controlled based on only the rotation speed of the engine, compared with a case of controlling an operation of a switching valve on the basis of both the rotation speed of an engine or the pressure of the hydraulic oil, occurrence of an engine stall can be prevented by a configuration that is simple in terms of both a hardware configuration and a control system.

DESCRIPTION OF EMBODIMENTS

Figure 1:
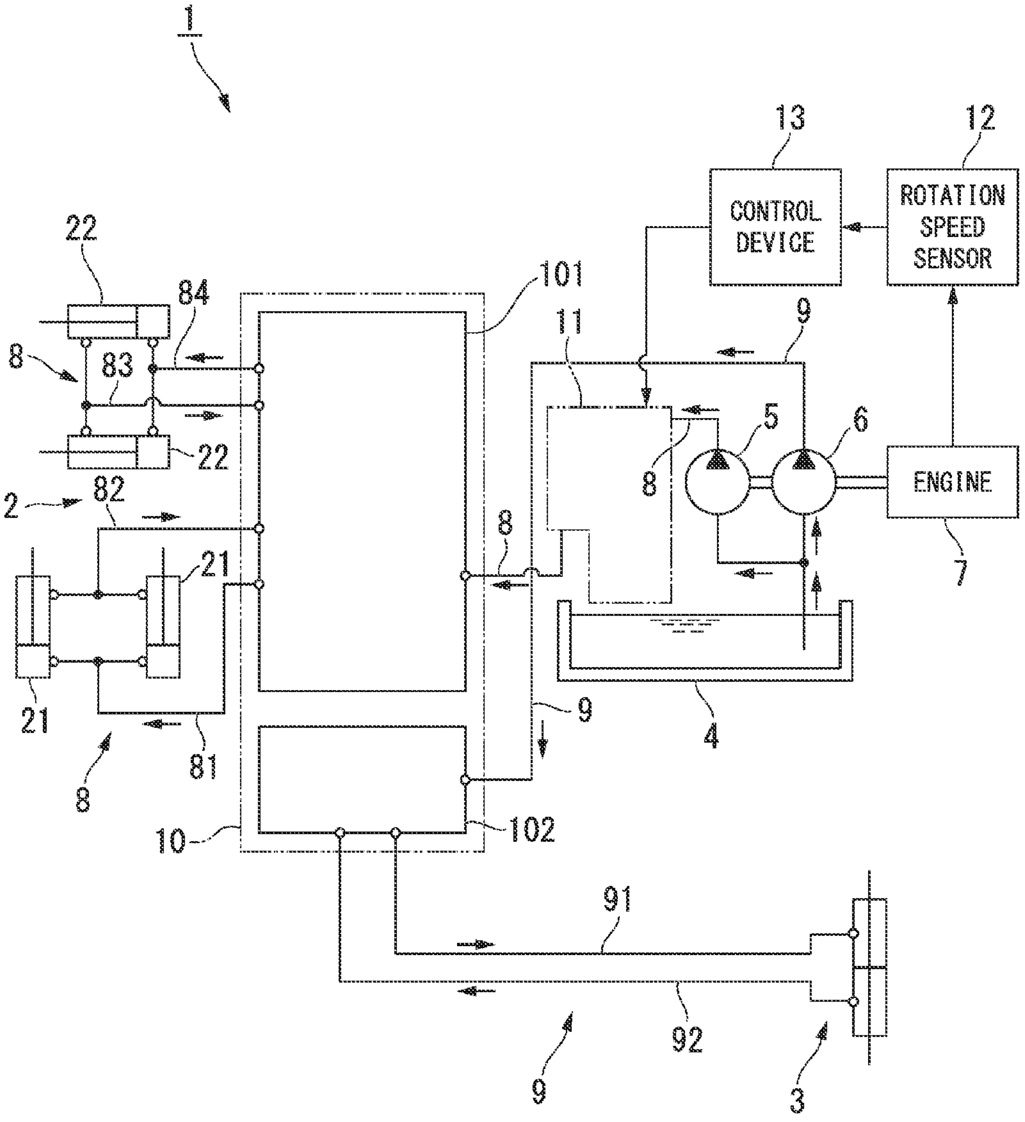
FIG. 1 is a schematic diagram showing the overall configuration of a forklift according to an embodiment of the invention.

Hereinafter, embodiments of the invention will be described with reference to the drawings. First, the overall configuration of a forklift as an industrial vehicle according to a first embodiment of the invention will be described. FIG. 1 is a schematic diagram showing the overall configuration of a forklift 1 according to the first embodiment.

The forklift 1 includes a hydraulically-operated device for cargo handling 2, a hydraulically-operated device for steering 3, a tank 4, a pump for cargo handling 5, a pump for steering 6, an engine 7, hydraulic piping for cargo handling 8, hydraulic piping for steering 9, a control valve 10, a pump load reduction system 11, a rotation speed sensor 12, and a control device 13.

The hydraulically-operated device for cargo handling 2 is operated by oil pressure and used in cargo handling. The hydraulically-operated device for steering 3 is operated by oil pressure and used to assist steering. In the tank 4, hydraulic oil for operating the hydraulically-operated device for cargo handling 2 and the hydraulically-operated device for steering 3 is stored. The pump for cargo handling 5 and the pump for steering 6 discharge the hydraulic oil pumped up from the tank 4. The engine 7 is a running drive source of the forklift 1 and also drives the pump for cargo handling 5 and the pump for steering 6. The hydraulic piping for cargo handling 8 connects the pump for cargo handling 5 and the hydraulically-operated device for cargo handling 2. The hydraulic piping for steering 9 connects the pump for steering 6 and the hydraulically-operated device for steering 3. The control valve 10 is provided in pathways of the hydraulic piping for cargo handling 8 and the hydraulic piping for steering 9 and at a position upstream of the hydraulically-operated device for cargo handling 2 and the hydraulically-operated device for steering 3. The pump load reduction system 11 is provided in pathways of the hydraulic piping for cargo handling 8 and the hydraulic piping for steering 9 and at a position downstream of the pump for cargo handling 5 and the pump for steering 6. The rotation speed sensor 12 detects a rotation speed of the engine 7. The control device 13 controls an operation of the pump load reduction system 11 on the basis of a sensing signal input from the rotation speed sensor 12.

The hydraulically-operated device for cargo handling 2 is, for example, a hydraulic cylinder for driving an arm that supports a burden. The hydraulically-operated device for cargo handling 2 has a cylinder for a vertical motion 21 for vertically moving the arm, and a cylinder for turning 22 for turning the arm, as shown in FIG. 1. On the other hand, the hydraulically-operated device for steering 3 is, for example, a hydraulic cylinder for assisting a driver of the forklift 1 to operate a steering device such as a steering wheel.

The control valve 10 is for controlling supply of the hydraulic oil to the hydraulically-operated device for cargo handling 2 and the hydraulically-operated device for steering 3. The control valve 10 has a cargo handling control section 101 and a steering control section 102, as shown in FIG. 1. The cargo handling control section 101 is connected to the hydraulic piping for cargo handling 8 extending from the pump load reduction system 11 and controls the supply of the hydraulic oil to the hydraulically-operated device for cargo handling 2. The steering control section 102 is connected to the hydraulic piping for steering 9 extending from the pump load reduction system 11 and controls supply of the hydraulic oil to the hydraulically-operated device for steering 3.

The hydraulic piping for cargo handling 8 is for connecting the pump for cargo handling 5 and the hydraulically-operated device for cargo handling 2. More specifically, the hydraulic piping for cargo handling 8 extends from the pump for cargo handling 5, goes through the pump load reduction system 11, further goes through the cargo handling control section 101 of the control valve 10, and is then connected to each of the cylinder for a vertical motion 21 and the cylinder for turning 22, as shown in FIG. 1.

Here, the hydraulic piping for cargo handling 8 includes supply piping 81 and return piping 82. The supply piping 81 supplies the hydraulic oil from the cargo handling control section 101 to the cylinder for a vertical motion 21 in a section from the cargo handling control section 101 to the cylinder for a vertical motion 21. The return piping 82 returns the hydraulic oil from the cylinder for a vertical motion 21 to the cargo handling control section 101. Similarly, the hydraulic piping for cargo handling 8 includes supply piping 83 and return piping 84. The supply piping 83 supplies the hydraulic oil from the cargo handling control section 101 to the cylinder for turning 22 in a section from the cargo handling control section 101 to the cylinder for turning 22. The return piping 84 returns the hydraulic oil from the cylinder for turning 22 to the cargo handling control section 101.

By such a configuration, by appropriately supplying or returning the hydraulic oil between the cargo handling control section 101 and the cylinder for a vertical motion 21 and the cylinder for turning 22, it becomes possible to vertically move and turn the arm that operates a burden, by a desired amount.

The hydraulic piping for steering 9 is for connecting the pump for steering 6 and the hydraulically-operated device for steering 3. More specifically, the hydraulic piping for steering 9 extends from the pump for steering 6, goes through the steering control section 102 of the control valve 10 without going through the pump load reduction system 11, and is then connected to the hydraulically-operated device for steering 3, as shown in FIG. 1.

Here, the hydraulic piping for steering 9 also includes supply piping 91 and return piping 92, similarly to the hydraulic piping for cargo handling 8. The supply piping 91 supplies the hydraulic oil from the steering control section 102 to the hydraulically-operated device for steering 3 in a section from the steering control section 102 to the hydraulically-operated device for steering 3. The return piping 92 returns the hydraulic oil from the hydraulically-operated device for steering 3 to the steering control section 102.

By such a configuration, by appropriately supplying or returning the hydraulic oil between the steering control section 102 and the hydraulically-operated device for steering 3, it becomes possible to move a power steering that assists in steering by a desired amount.

Figure 2:
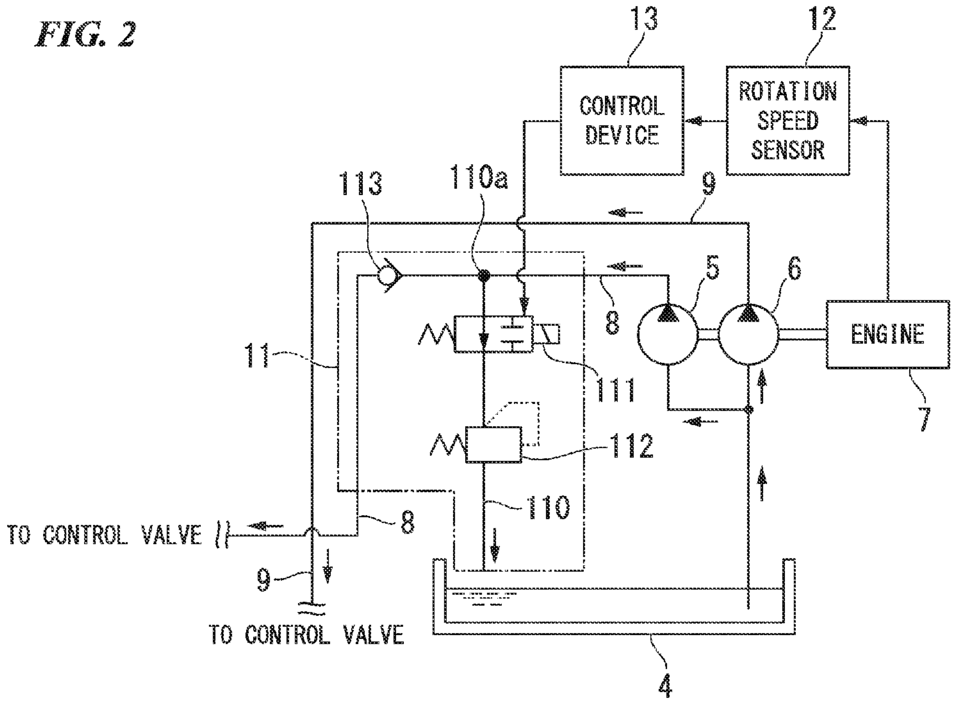
FIG. 2 is a schematic diagram showing the detailed configuration of a pump load reduction system regarding a forklift according to a first embodiment of the invention.

The pump load reduction system 11 is for adjusting a load which is applied to the pump for cargo handling 5, depending on the output of the engine 7. Here, FIG. 2 is a schematic diagram showing the detailed configuration of the pump load reduction system 11 regarding the forklift 1 according to the first embodiment. The pump load reduction system 11 has discharge piping 110, a switching valve 111, a sub-relief valve 112, and a check valve 113. The discharge piping 110 branches from the hydraulic piping for cargo handling 8 and is connected to the tank 4. The switching valve 111 is provided in the discharge piping 110. The sub-relief valve 112 is provided further to the downstream side than the switching valve 111 in the discharge piping 110. The check valve 113 is provided further to the downstream side than a branching position 110*a* of the discharge piping 110 in the hydraulic piping for cargo handling 8.

In addition, in this embodiment, the installation position of the sub-relief valve 112 in the discharge piping 110 is set to be further on the downstream side than the switching valve 111. However, alternatively, the installation position may also be further on the upstream side than the switching valve 111.

The switching valve 111 is for opening the discharge piping 110 such that the hydraulic oil can flow therethrough, or closing the discharge piping 110 such that the hydraulic oil cannot flow therethrough. The switching valve 111 is provided at a downstream position of the branching position 110*a* in the discharge piping 110, as shown in FIG. 2. Then, the control device 13 controls an operation of the switching valve 111 on the basis of the detection result of the rotation speed sensor 12.

The sub-relief valve 112 is for limiting the maximum pressure of the hydraulic oil, that is, for preventing the pressure of the hydraulic oil from increasing beyond a predetermined value. To describe in more detail, in a case where the pressure of the hydraulic oil flowing through the discharge piping 110 is smaller than the predetermined relief pressure, the sub-relief valve 112 closes the discharge piping 110. In this way, a state is created where the hydraulic oil flowing through the discharge piping 110 cannot flow to the downstream side across the sub-relief valve 112. On the other hand, if the pressure of the hydraulic oil flowing through the discharge piping 110 reaches the relief pressure, the sub-relief valve 112 opens the discharge piping 110. In this way, the hydraulic oil flowing through the discharge piping 110 flows to the downstream side across the sub-relief valve 112 and is discharged to the tank 4. Then, if the pressure of the hydraulic oil becomes smaller than the relief pressure, the sub-relief valve 112 closes the discharge piping 110 again.

The check valve 113 is for preventing the hydraulic oil from flowing backward in the hydraulic piping for cargo handling 8. That is, the check valve 113 is made so as to allow the hydraulic oil to flow toward a side of the control valve 10 from a side of the pump for cargo handling 5, but to regulate the flow of the hydraulic oil toward a side of the pump for cargo handling 5 from a side of the control valve 10. In addition, the check valve 113 is not a configuration essential for the invention and the pump load reduction system 11 may also be constituted by the discharge piping 110, the switching valve 111, and the sub-relief valve 112.

Next, the operation and effects of the forklift 1 according to the first embodiment will be described. First, in a case where the rotation speed of the engine 7 which is detected by the rotation speed sensor 12 shown in FIG. 2 is larger than a predetermined value, that is, in a case where the output of the engine 7 is high, the switching valve 111 subjected to control by the control device 13 closes the discharge piping 110. Then, all of the hydraulic oil discharged from the pump for cargo handling 5 is supplied to the hydraulically-operated device for cargo handling 2 through the control valve 10. In this way, when the output of the engine 7 is high, and thus an engine stall does not easily occur, all the pressure of the hydraulic oil which is discharged from the pump for cargo handling 5 is used to operate the hydraulically-operated device for cargo handling 2.

On the other hand, in a case where the rotation speed of the engine 7 is smaller than a predetermined value, that is, in a case where the output of the engine 7 is low, the switching valve 111 subjected to control by the control section opens the discharge piping 110. Then, some of the hydraulic oil discharged from the pump for cargo handling 5 flows from the hydraulic piping for cargo handling 8 into the discharge piping 110 and flows further to the downstream side across the switching valve 111, thereby reaching the sub-relief valve 112.

Here, in a case where the pressure of the hydraulic oil that reached the sub-relief valve 112 is lower than the relief pressure, the sub-relief valve 112 regulates the flow of the hydraulic oil to the downstream side. Then, the hydraulic oil that flowed from the hydraulic piping for cargo handling 8 into the discharge piping 110 cannot flow to the downstream side across the sub-relief valve 112 and is not discharged to the tank 4. Therefore, eventually, all of the hydraulic oil discharged from the pump for cargo handling 5 is supplied to the hydraulically-operated device for cargo handling 2 through the control valve 10. In this way, when the output of the engine 7 is low and the load of the pump for cargo handling 5 is also low and thus an engine stall does not easily occur, all the pressure of the hydraulic oil which is discharged from the pump for cargo handling 5 is used to operate the hydraulically-operated device for cargo handling 2.

On the other hand, in a case where the pressure of the hydraulic oil that reached the sub-relief valve 112 is higher than the relief pressure, the sub-relief valve 112 slightly opens the discharge piping 110, thereby discharging some of the hydraulic oil to the tank 4, whereby the pressure of the hydraulic oil is regulated so as to become less than or equal to the relief pressure. In this way, when the load of the pump for cargo handling 5 is high despite low output of the engine 7 and an engine stall is prone to occur, by reducing the load of the pump for cargo handling 5 by reducing the pressure of the hydraulic oil, occurrence of an engine stall due to a shortage of the torque of the engine 7 can be prevented before it happens.

Further, since the amount of the hydraulic oil which is discharged in order to reduce the load of the pump for cargo handling 5 is only some of the hydraulic oil discharged from the pump for cargo handling 5, an operation speed of the hydraulically-operated device for cargo handling 2 does not fall significantly and a reduction in operability can be minimized.

Further, since, although the pressure of the hydraulic oil is reduced, the relief pressure is secured, and thus minimum oil pressure necessary to operate the hydraulically-operated device for cargo handling 2 is supplied, a reduction in the operability of the hydraulically-operated device for cargo handling 2 can be minimized.

Figure 3:
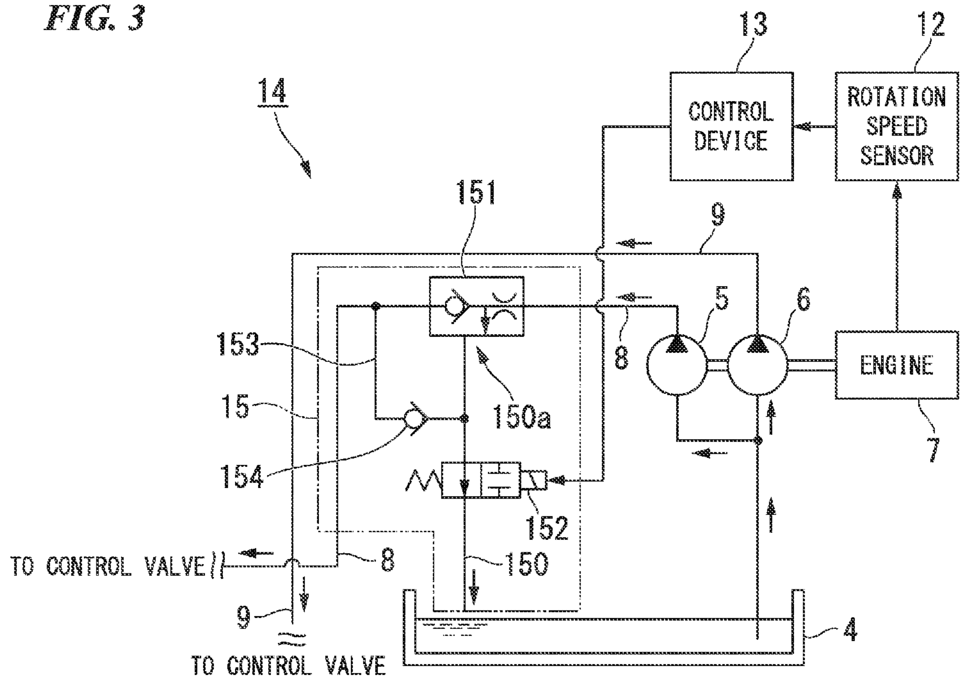
FIG. 3 is a schematic diagram showing the detailed configuration of a pump load reduction system regarding a forklift according to a second embodiment of the invention.

Next, the overall configuration of a forklift as an industrial vehicle according to a second embodiment of the invention will be described. In a forklift 14 according to the second embodiment, compared with the forklift 1 according to the first embodiment shown in FIG. 1, only the configuration of a pump load reduction system 15 is different. FIG. 3 is a schematic diagram showing the detailed configuration of the pump load reduction system 15 regarding the forklift 14 according to the second embodiment. In addition, since the configurations other than the pump load reduction system 15 are the same as those in the forklift 1 according to the first embodiment, in FIG. 3, the same reference numerals as those in FIG. 1 are used, and description is omitted here.

The pump load reduction system 15 has discharge piping 150, a priority valve 151, a switching valve 152, bypass piping 153, and a check valve 154. The discharge piping 150 branches from the hydraulic piping for cargo handling 8 and is connected to the tank 4. The priority valve 151 is provided at a branching position 150*a* of the discharge piping 150 in the hydraulic piping for cargo handling 8. The switching valve 152 is provided in the discharge piping 150. The bypass piping 153 connects the discharge piping 150 and the hydraulic piping for cargo handling 8. The check valve 154 is provided in the bypass piping 153.

The priority valve 151 is for distributing the hydraulic oil that flowed from the upstream side thereto, thereby making the hydraulic oil flow to the downstream side. To describe in more detail, the priority valve 151 is made so as to make all of the flow rate flow to the hydraulic piping for cargo handling 8 on the downstream side in a case where the flow rate of the hydraulic oil flowing through the hydraulic piping for cargo handling 8 on the upstream side is smaller than a preset flow rate determined in advance. On the other hand, the priority valve 151 is made so as to make a preset flow rate of hydraulic oil flow to the hydraulic piping for cargo handling 8 on the downstream side and the remaining flow rate of hydraulic oil flow to the discharge piping 150, in a case where the flow rate of the hydraulic oil flowing through the hydraulic piping for cargo handling 8 on the upstream side is greater than a preset flow rate.

Further, the priority valve 151 also has a function to prevent the hydraulic oil from flowing backward in the hydraulic piping for cargo handling 8 and the discharge piping 150. That is, the priority valve 151 allows the hydraulic oil to flow toward a side of the control valve 10 from a side of the pump for cargo handling 5 and also allows the hydraulic oil to flow toward a side of the switching valve 152 from a side of the pump for cargo handling 5. However, the priority valve 151 regulates flow of the hydraulic oil toward a side of the pump for cargo handling 5 from a side of the control valve 10 and also regulates flow of the hydraulic oil toward a side of the pump for cargo handling 5 from a side of the switching valve 152.

The switching valve 152 is for opening the discharge piping 150 such that the hydraulic oil can flow therethrough, or closing the discharge piping 150 such that the hydraulic oil cannot flow therethrough. The switching valve 152 is provided at a given position further to the downstream side than the branching position 150*a* in the discharge piping 150, as shown in FIG. 3. Then, the control device 13 controls an operation of the switching valve 152 on the basis of the detection result of the rotation speed sensor 12.

The bypass piping 153 is for returning the hydraulic oil that flowed to the discharge piping 150 to the hydraulic piping for cargo handling 8. The bypass piping 153 is provided to connect a position further to the upstream side than the switching valve 152 in the discharge piping 150 and a position further to the downstream side than the priority valve 151 in the hydraulic piping for cargo handling 8, as shown in FIG. 3. In this way, the hydraulic oil distributed by the priority valve 151, thereby flowing from the hydraulic piping for cargo handling 8 into the discharge piping 150, can flow into the hydraulic piping for cargo handling 8 again through the bypass piping 153.

The check valve 154 is for inhibiting backflow of the hydraulic oil in the bypass piping 153. That is, the check valve 154 is made so as to allow the hydraulic oil to flow toward a side of the hydraulic piping for cargo handling 8 from a side of the discharge piping 150 in the bypass piping 153, but to regulate flow of the hydraulic oil toward a side of the discharge piping 150 from a side of the hydraulic piping for cargo handling 8. In addition, the check valve 154 is not a configuration essential for the invention and the pump load reduction system 15 may also be constituted by the discharge piping 150, the priority valve 151, the switching valve 152, and the bypass piping 153.

Next, the operation and effects of the forklift 14 according to the second embodiment will be described. First, in a case where the flow rate of the hydraulic oil discharged from the pump for cargo handling 5 shown in FIG. 3 is smaller than a preset flow rate, the priority valve 151 makes all the flow rate flow to the hydraulic piping for cargo handling 8 on the downstream side. In this way, when the flow rate of the hydraulic oil is small and the load of the pump for cargo handling 5 is low, regardless of a level of the output of the engine 7, all of the hydraulic oil discharged from the pump for cargo handling 5 is supplied to the hydraulically-operated device for cargo handling 2 through the control valve 10 and all the pressure of the hydraulic oil is used to operate the hydraulically-operated device for cargo handling 2.

On the other hand, in a case where the flow rate of the hydraulic oil which is discharged from the pump for cargo handling 5 shown in FIG. 3 is greater than a preset flow rate, the priority valve 151 makes a preset flow rate of hydraulic oil flow to the hydraulic piping for cargo handling 8 on the downstream side and also makes the remaining flow rate of hydraulic oil flow to the discharge piping 150.

Here, in a case where the rotation speed of the engine 7 which is detected by the rotation speed sensor 12 shown in FIG. 3 is larger than a predetermined value, that is, in a case where the output of the engine 7 is high, the switching valve 152 subjected to control by the control device 13 closes the discharge piping 150. Then, the hydraulic oil distributed by the priority valve 151, thereby flowing from the hydraulic piping for cargo handling 8 to the discharge piping 150, cannot flow to the downstream side across the switching valve 152 and is not discharged to the tank 4. Therefore, the hydraulic oil flowed from the hydraulic piping for cargo handling 8 into the discharge piping 150 flows into the hydraulic piping for cargo handling 8 again through the bypass piping 153. As a result, all of the hydraulic oil discharged from the pump for cargo handling 5 is supplied to the hydraulically-operated device for cargo handling 2 through the control valve 10. In this manner, even in a case where the flow rate of the hydraulic oil is large, and thus the load of the pump for cargo handling 5 is high, at the time of a state where the output of the engine 7 is high, and thus an engine stall does not easily occur, all the pressure of the hydraulic oil which is discharged from the pump for cargo handling 5 is used to operate the hydraulically-operated device for cargo handling 2.

On the other hand, in a case where the rotation speed of the engine 7 is smaller than a predetermined value, that is, in a case where the output of the engine 7 is low, the switching valve 152 subjected to control by the control device 13 opens the discharge piping 150. Then, the hydraulic oil distributed by the priority valve 151, thereby flowing from the hydraulic piping for cargo handling 8 into the discharge piping 150, flows further to the downstream side across the switching valve 152 and is discharged to the tank 4. In this way, only a preset flow rate of the hydraulic oil discharged from the pump for cargo handling 5 is supplied to the hydraulically-operated device for cargo handling 2 through the control valve 10. In this manner, in a case where the flow rate of the hydraulic oil is large and the load of the pump for cargo handling 5 is high, if a state is created where the output of the engine 7 is lowered, and thus an engine stall is prone to occur, occurrence of an engine stall can be prevented before it happens by reducing the load of the pump for cargo handling 5 by reducing the flow rate of the hydraulic oil.

Further, although the flow rate of the hydraulic oil is reduced, a preset flow rate is secured and thus a minimum flow rate necessary to operate the hydraulically-operated device for cargo handling 2 is supplied. Therefore, a reduction in the operability of the hydraulically-operated device for cargo handling 2 can be minimized.

Figure 4:
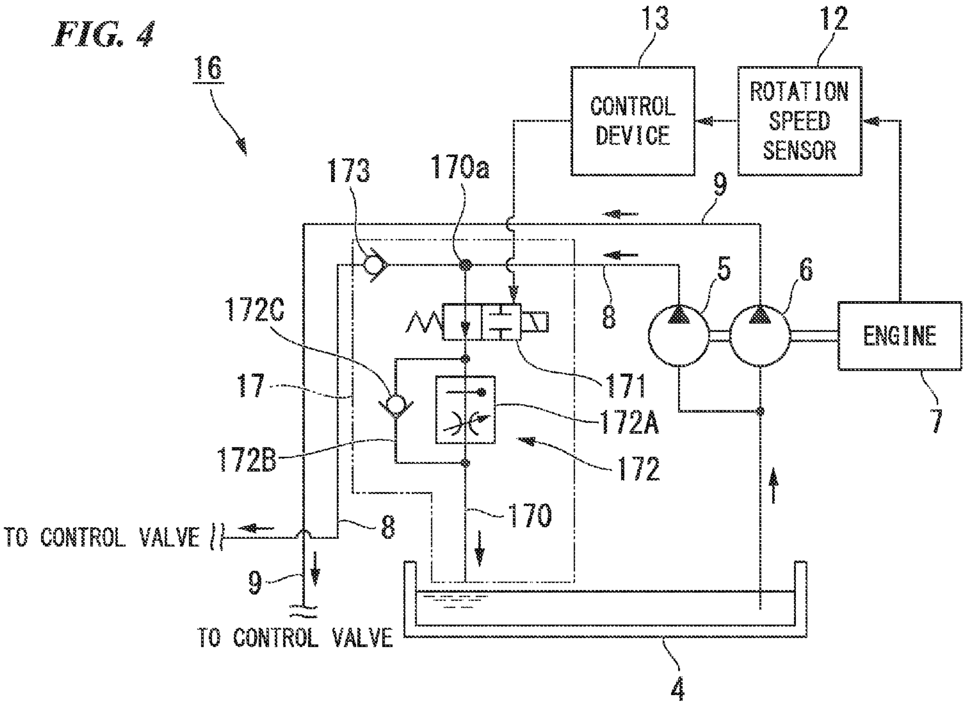
FIG. 4 is a schematic diagram showing the detailed configuration of a pump load reduction system regarding a forklift according to a third embodiment of the invention.
Figure 5:
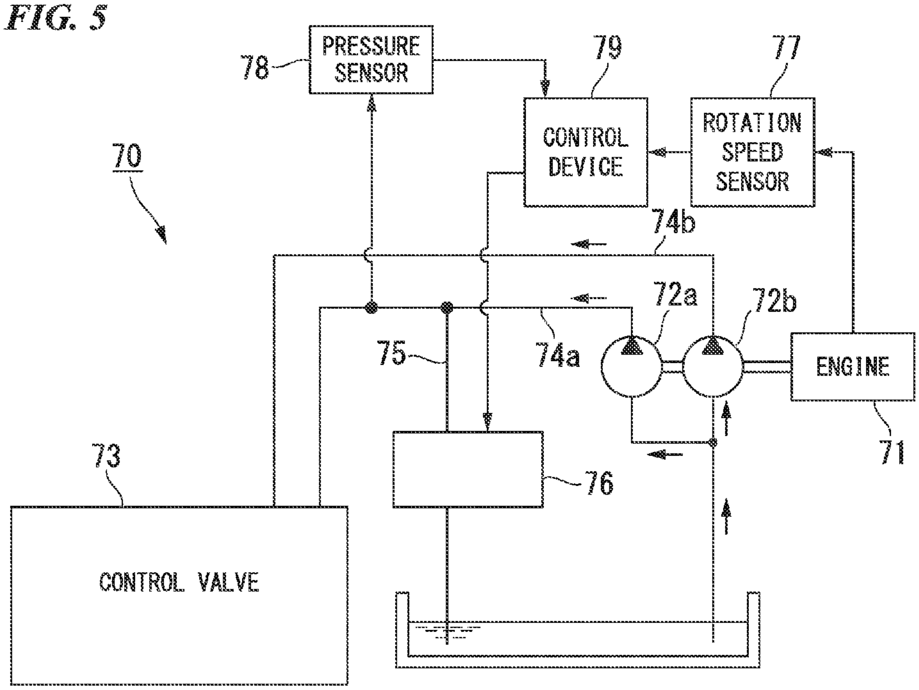
FIG. 5 is a schematic diagram showing a hydraulic system of an industrial vehicle according to an example of the related art.

Next, the overall configuration of a forklift as an industrial vehicle according to a third embodiment of the invention will be described. In a forklift 16 according to the third embodiment, compared with the forklift 1 according to the first embodiment shown in FIG. 1, only the configuration of a pump load reduction system 17 is different. FIG. 4 is a schematic diagram showing the detailed configuration of the pump load reduction system 17 regarding the forklift 16 according to the third embodiment. In addition, since the configurations other than the pump load reduction system 17 are the same as those in the forklift 1 according to the first embodiment, in FIG. 4, the same reference numerals as those in FIG. 1 are used, and description is omitted here.

The pump load reduction system 17 has discharge piping 170, a switching valve 171, a flow regulator valve 172, and a check valve for hydraulic piping 173. The discharge piping 170 branches from the hydraulic piping for cargo handling 8 and is connected to the tank 4. The switching valve 171 is provided in the discharge piping 170. The flow regulator valve 172 is provided further to the downstream side than the switching valve 171 in the discharge piping 170. The check valve for hydraulic piping 173 is provided in the hydraulic piping for cargo handling 8.

In addition, in this embodiment, the installation position of the flow regulator valve 172 in the discharge piping 170 is set to be further on the downstream side than the switching valve 171. However, alternatively, the installation position may also be further on the upstream side than the switching valve 171.

The switching valve 171 is for opening the discharge piping 170 such that the hydraulic oil can flow therethrough, or closing the discharge piping 170 such that the hydraulic oil cannot flow therethrough. The switching valve 171 is provided at a downstream position of a branching position **170*a* in the discharge piping 170, as shown in FIG. 4. Then, the control device 13 controls an operation of the switching valve 171 on the basis of the detection result of the rotation speed sensor 12**.

The flow regulator valve 172 limits the maximum flow rate of the hydraulic oil. That is, the flow regulator valve 172 is for preventing the flow rate of the hydraulic oil from increasing beyond a predetermined value. The flow regulator valve 172 has a throttle valve 172A, bypass piping 172B, and a check valve for bypass piping 172C, as shown in FIG. 4. The throttle valve 172A can adjust a flow rate in the discharge piping 170. The bypass piping 172B connects the upstream side and the downstream side of the throttle valve 172A. The check valve for bypass piping 172C inhibits the flow of the hydraulic oil from the branching position **170*a* side to the tank 4 side in the bypass piping 172**B.

According to the flow regulator valve 172 which is configured in this manner, in a case where pressure on the upstream side, that is, the branching position **170*a* side is larger than a predetermined value, the throttle valve 172A reduces the degree of opening of the discharge piping 170, whereby the flow rate of the hydraulic oil which is discharged from the discharge piping 170 is limited to the maximum value set in advance. On the other hand, in a case where the pressure on the upstream side is less than or equal to a predetermined value, the throttle valve 172A adjusts the degree of opening of the discharge piping 170, whereby the flow rate of the hydraulic oil which is discharged from the discharge piping 170** becomes a value which is less than or equal to the maximum value set in advance and corresponds to the pressure on the upstream side.

In addition, in the bypass piping 172B, the check valve for bypass piping 172C is provided, as described above. Therefore, since only in a case where the pressure on the upstream side becomes lower than the pressure on the downstream side for some reason, the hydraulic oil stored in the tank 4 flows to a side of the branching position **170*a* through the bypass piping 172B, damage to the pump for cargo handling 5, the pump for steering 6**, or other hydraulic equipment can be prevented.

The check valve for hydraulic piping 173 is for inhibiting backflow of the hydraulic oil in the hydraulic piping for cargo handling 8. That is, the check valve for hydraulic piping 173 is made so as to allow the hydraulic oil to flow toward a side of the control valve 10 from a side of the pump for cargo handling 5 in the hydraulic piping for cargo handling 8, but to regulate flow of the hydraulic oil toward a side the pump for cargo handling 5 from a side of the control valve 10. The check valve for hydraulic piping 173 is provided further to the downstream side than the branching position **170*a* of the discharge piping 170 in the hydraulic piping for cargo handling 8, as shown in FIG. 4. In addition, the check valve for hydraulic piping 173 is not a configuration essential for the invention and the pump load reduction system 17 may also be constituted by the discharge piping 170, the switching valve 171, and the flow regulator valve 172**.

Next, the operation and effects of the forklift 16 according to the third embodiment will be described. First, in a case where the rotation speed of the engine 7 which is detected by the rotation speed sensor 12 shown in FIG. 4 is larger than a predetermined value, that is, in a case where the output of the engine 7 is high, the switching valve 171 subjected to control by the control section closes the discharge piping 170. Therefore, all of the hydraulic oil discharged from the pump for cargo handling 5 is supplied to the hydraulically-operated device for cargo handling 2 through the control valve 10. In this way, when the output of the engine 7 is high and an engine stall does not easily occur, all the pressure of the hydraulic oil which is discharged from the pump for cargo handling 5 is used to operate the hydraulically-operated device for cargo handling 2.

On the other hand, in a case where the rotation speed of the engine 7 is smaller than a predetermined value, that is, in a case where the output of the engine 7 is low, the switching valve 171 subjected to control by the control device 13 opens the discharge piping 170. Then, some of the hydraulic oil discharged from the pump for cargo handling 5 flows from the hydraulic piping for cargo handling 8 into the discharge piping 170 and flows further to the downstream side across the switching valve 171, thereby reaching the flow regulator valve 172.

Here, in a case where the flow rate of the hydraulic oil that reached the flow regulator valve 172 is less than or equal to the maximum value set in advance, the hydraulic oil of a flow rate depending on pressure on the upstream side, that is, the branching position 170*a* side of the flow regulator valve 172, is discharged from the discharge piping 170 to the tank 4. In this manner, in a case where the engine 7 is at a low revolution and the output thereof is low, since the control device 13 discharges some of the hydraulic oil from the discharge piping 170 to the tank 4, the flow rate of the hydraulic oil which is supplied to the hydraulically-operated device for cargo handling 2 is reduced. In this way, the load of the pump for cargo handling 5 is reduced, and thus occurrence of an engine stall due to a shortage of the torque of the engine 7 can be prevented before it happens.

On the other hand, if the flow rate of the hydraulic oil that reached the flow regulator valve 172 reaches the maximum value set in advance, the throttle valve 172A constituting the flow regulator valve 172 reduces the degree of opening of the discharge piping 170, whereby the flow rate of the hydraulic oil which is discharged from the discharge piping 170 to the tank 4 is limited to the set maximum value. Therefore, the flow rate of the hydraulic oil which is discharged from the discharge piping 170 to the tank 4 does not become excessive and the minimum hydraulic oil is supplied to the hydraulically-operated device for cargo handling 2. In this way, an operation speed of the hydraulically-operated device for cargo handling 2 does not fall significantly and a reduction in operability can be minimized.

In addition, in the first to third embodiments, the discharge piping 110, 150, or 170 is connected to the tank 4 which stores the hydraulic oil. However, a place to which the hydraulic oil is discharged is not limited to the tank 4, and a dedicated container (not shown) for discharging the hydraulic oil to may also be provided separately from the tank 4.

Further, in the first to third embodiments, a case of reducing the load of the pump for cargo handling 5 has been described as an example by taking the hydraulically-operated device for cargo handling 2 as an example of a hydraulically-operated device according to the invention, the pump for cargo handling 5 as an example of a hydraulic pump, and the hydraulic piping for cargo handling 8 as an example of hydraulic piping. However, alternatively or along with this, the load of the pump for steering 6 may also be reduced by adopting the hydraulically-operated device for steering 3 as a hydraulically-operated device according to the invention, the pump for steering 6 as a hydraulic pump, and the hydraulic piping for steering 9 as hydraulic piping.

In addition, the shapes, combinations, operating procedure, or the like of the respective constituent members shown in the embodiments described above are examples and various changes can be made based on design requirements or the like within a scope that does not depart from the spirit of the invention.

INDUSTRIAL APPLICABILITY

The invention relates to an industrial vehicle which includes an engine that is a driving source, a hydraulically-operated device that is operated by oil pressure, a hydraulic pump that is driven by the engine and supplies hydraulic oil to the hydraulically-operated device, hydraulic piping that connects the hydraulic pump and the hydraulically-operated device, discharge piping that branches from the hydraulic piping and is connected to a tank, a switching valve that is provided in the discharge piping and can switch opening or closing of the discharge piping, a control device that closes the discharge piping by controlling the switching valve in a case where the rotation speed of the engine is larger than a predetermined value, and opens the discharge piping by controlling the switching valve in a case where the rotation speed of the engine is less than or equal to a predetermined value, and a valve that adjusts the flow rate of the hydraulic oil which is discharged from the discharge piping to the tank, on the basis of the pressure or the flow rate of the hydraulic oil which flows from the hydraulic pump into the hydraulic piping.

According to the invention, when the rotation speed of the engine is larger than a predetermined value, the hydraulic oil discharged from the hydraulic pump is not discharged to the tank and all the hydraulic oil is supplied to the hydraulically-operated device. On the other hand, if the rotation speed of the engine becomes less than or equal to a predetermined value, the switching valve subjected to control of the control device opens the discharge piping. In this way, minimum oil pressure required for the hydraulically-operated device can be supplied.

REFERENCE SIGNS LIST

1: industrial vehicle
10: control valve
101: cargo handling control section
102: steering control section
11: pump load reduction system
110: discharge piping
110*a*: branching position
111: switching valve
112: sub-relief valve
113: check valve
12: rotation speed sensor
13: control device
14: industrial vehicle
15: pump load reduction system
150: discharge piping
150*a*: branching position
151: priority valve
152: switching valve
153: bypass piping
154: check valve
16: industrial vehicle
17: pump load reduction system
170: discharge piping
170*a*: branching position
171: switching valve
172: flow regulator valve

172A: throttle valve
172B: bypass piping
172C: check valve for bypass piping
173: check valve for hydraulic piping
2: hydraulically-operated device for cargo handling
21: cylinder for vertical motion
22: cylinder for turning
3: hydraulically-operated device for steering
4: tank
5: pump for cargo handling
6: pump for steering
7: engine
70: industrial vehicle
71: engine
72*a*: pump for cargo handling
72*b*: pump for steering
73: control valve
74*a*, 74*b*: hydraulic piping
75: discharge piping
76: unloading valve
77: rotation speed sensor
78: pressure sensor
79: control device
8: hydraulic piping for cargo handling
81, 83, 91: supply piping
82, 84, 92: return piping
9: hydraulic piping for steering

The invention claimed is:

1. An industrial vehicle comprising:

an engine that is a driving source;

a hydraulically-operated device that is operated by oil pressure;

a hydraulic pump that is driven by the engine and supplies hydraulic oil to the hydraulically-operated device;

hydraulic piping that connects the hydraulic pump and the hydraulically-operated device;

discharge piping that branches from the hydraulic piping and is connected to a tank;

a switching valve that is provided in the discharge piping and is capable of switching opening or closing of the discharge piping;

a control device that closes the discharge piping by controlling the switching valve in a case where a rotation speed of the engine is larger than a predetermined value, and opens the discharge piping by controlling the switching valve in a case where the rotation speed of the engine is less than or equal to a predetermined value;

a valve that adjusts the flow rate of the hydraulic oil which is discharged from the discharge piping to the tank, on the basis of the pressure or the flow rate of the hydraulic oil which flows from the hydraulic pump into the hydraulic piping; and bypass piping that connects a position further to the upstream side than the switching valve in the discharge piping and a position further to the downstream side than a branching position of the discharge piping in the hydraulic piping, wherein the valve is provided at the branching position and distributes the hydraulic oil flowing from the hydraulic pump into the hydraulic piping, thereby making a preset flow rate of hydraulic oil flow to a side of the hydraulically-operated device and a remaining hydraulic oil flow to the discharge piping.

* * * * *